(12) United States Patent
Kan et al.

(10) Patent No.: US 6,528,909 B1
(45) Date of Patent: Mar. 4, 2003

(54) MOTOR SHAFT HAVING AN INTEGRAL HEAT PIPE

(75) Inventors: John C. Kan, Danville, CA (US); Neal Bertram Schirle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 09/006,920

(22) Filed: Jan. 14, 1998

(51) Int. Cl.[7] .................................................. H02K 9/00
(52) U.S. Cl. ..................... 310/52; 310/67 R; 360/99.04; 360/99.08
(58) Field of Search ............................... 310/67 R, 52, 310/54, 58, 64; 360/98.07, 99.03, 99.04, 99.08, 99.09, 99.11

(56) References Cited

U.S. PATENT DOCUMENTS

| | | | | |
|---|---|---|---|---|
| 2,330,121 A | * | 9/1943 | Heintz ........................ | 310/54 |
| 2,743,384 A | * | 4/1956 | Turner et al. ................ | 310/54 |
| 3,801,843 A | | 4/1974 | Corman et al. .............. | 310/52 |
| 3,914,630 A | * | 10/1975 | Lloyd et al. ................. | 310/61 |
| 4,137,472 A | | 1/1979 | Workman ..................... | 310/61 |
| 4,240,000 A | | 12/1980 | Harano et al. ............... | 310/64 |
| 4,406,959 A | | 9/1983 | Harano et al. ............... | 310/58 |
| 4,814,652 A | * | 3/1989 | Wright ....................... | 310/67 R |
| 5,160,865 A | * | 11/1992 | Gururangan ................. | 310/67 R |
| 5,283,488 A | | 2/1994 | Ponnappan et al. .......... | 310/55 |
| 5,394,040 A | | 2/1995 | Khanh ......................... | 310/54 |
| 5,705,868 A | * | 1/1998 | Cox et al. .................... | 310/71 |

FOREIGN PATENT DOCUMENTS

| | | | | |
|---|---|---|---|---|
| JP | 58-101525 | 1/1983 | ........... | G11B/25/04 |
| JP | 59-89549 | 5/1984 | ........... | H02K/9/22 |
| JP | 61-214173 | 9/1985 | ........... | G11B/19/20 |
| JP | 61-214175 | 9/1986 | ........... | G11B/19/20 |
| JP | 61-233488 | 10/1986 | ........... | G11B/33/14 |
| JP | 61-269285 | 11/1986 | ........... | G11B/33/14 |
| JP | 62-262632 | 11/1987 | ........... | H02K/9/22 |
| JP | 63-211166 | 9/1988 | ........... | G11B/19/20 |
| JP | 3-84793 | 4/1991 | ........... | G11B/33/14 |

* cited by examiner

*Primary Examiner*—Burton S. Mullins
(74) *Attorney, Agent, or Firm*—Monica D. Lee; Robert B. Martin

(57) ABSTRACT

A spindle motor assembly having a shaft with an integral heat pipe. The shaft with the integral heat pipe improves the thermal conductivity of the shaft and the spindle motor assembly. The shaft includes an elongated portion and a sealing structure. For one embodiment, the sealing structure includes a cap and a gasket that are joined to the shaft by a brazing process.

23 Claims, 4 Drawing Sheets

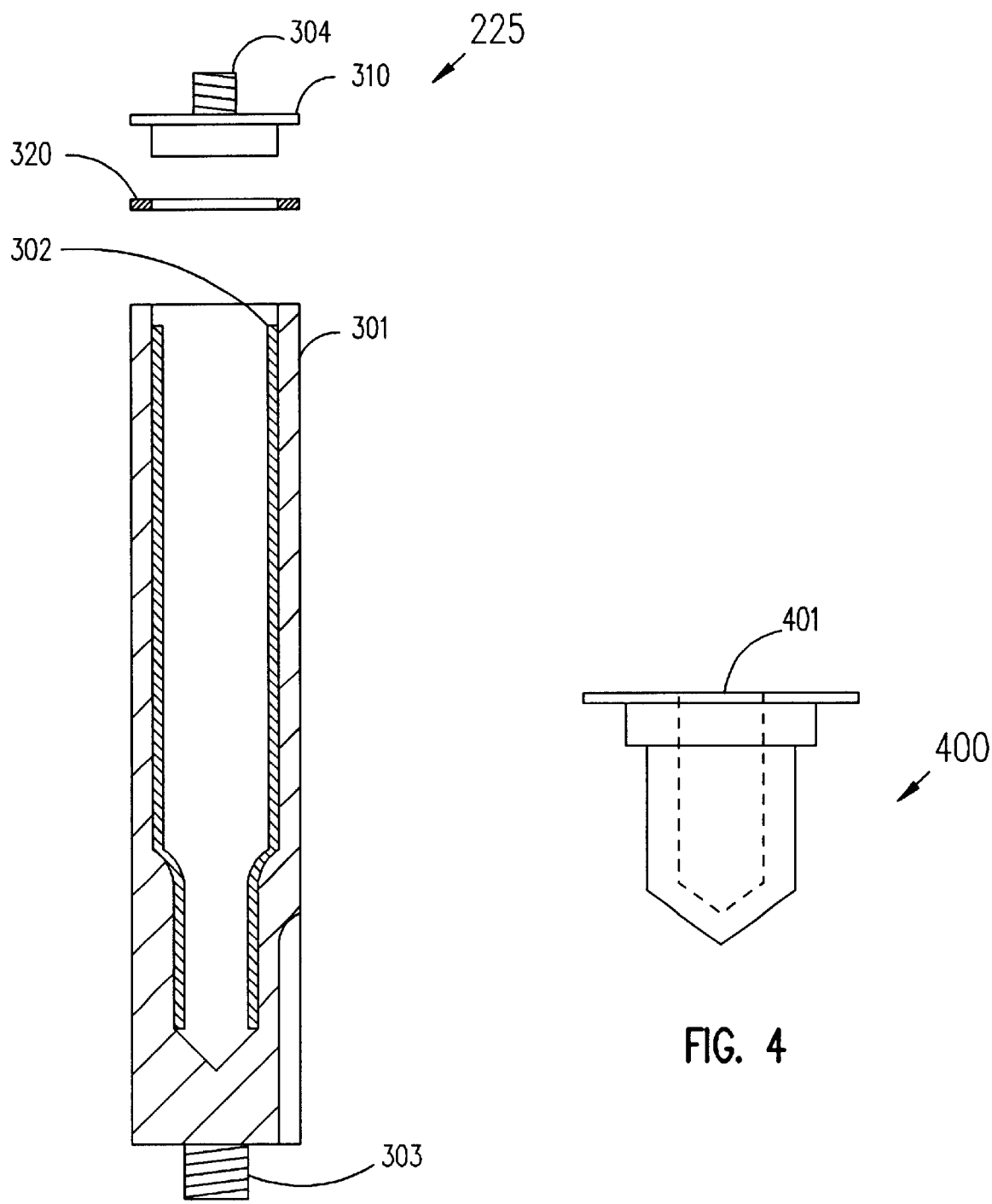

MOTOR SHAFT HAVING AN INTEGRAL HEAT PIPE

BACKGROUND OF THE INVENTION

1. Field of the Invention

The present invention relates generally to magnetic storage systems, and in particular a spindle motor assembly having increased heat dissipation.

2. Description of the Related Art

Magnetic storage systems may store data on at least one rotatable magnetic disk having concentric data tracks. Data is read from or written to each magnetic disk by a magnetic recording head or transducer, which is supported by a slider. Each transducer may be attached to or integrally formed with a slider, which is resiliently supported by a suspension assembly. During operation of the magnetic storage system, a slider typically supports a transducer above the data surface of a magnetic disk by a cushion of air, referred to as an air bearing surface, generated by the rotating disk.

The transducer/slider/suspension assembly is coupled to an actuator for positioning the transducer over the desired data track during reading or writing operations. The actuator positions the transducer over the desired data track by moving the transducer/slider/suspension assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm), attached to the rear portion of the actuator arm(s), powers the movement of the actuator over the disks.

The magnetic disk or disks are mounted on the hub of a spindle motor assembly. High capacity, high speed magnetic storage systems, such as 7200 rotations per minute (rpm) hard disk drives having a 9 gigabyte capacity, may have a spindle motor assembly that includes a shaft, at least two ball bearing assemblies, a brushless direct current (dc) motor, and a hub. The ball bearing assemblies allow the hub and the magnetic disks to rotate with respect to the shaft when powered by the motor.

As the industry demands larger capacity drives rotating at faster speeds within same form factor (e.g., 1.63×4.00×5.75 inches), the load placed on the motor is increased. The largest contribution to load is viscous dissipation (also referred to as actual drag of air or windage loss), which is highly sensitive to disk speed. Increasing the capacity of the drives without increasing the diameter of the disks may also require that the number of disks loaded onto the hub be increased, resulting in an increased load on the motor.

Most high performance disk drives on the market today have a stationary shaft to increase shaft stiffness and to provide a more sound structure. The increased stiffness provided by a stationary shaft design causes less deflection and better track misregistration (tmr) performance parameters than rotating shafts. Generally, as more load is applied to the motor, the motor is required to do more work resulting in an increase in the power dissipation of the motor. The power dissipated by the motor, and more specifically in stator windings and stator itself, looses heat which primarily travels through the stationary shaft.

Shafts used in today's motors for high speed disk drives may be made of 300 or 400 series stainless steel. These types of steels are known to have low heat conductivity as compared to other metals such as Aluminum or Copper. Because of the low thermal conductivity of the stainless steel shafts, the shaft prevents most of the heat dissipated from the motor from flowing to the outer surfaces of the spindle motor assembly. As a result, the stator portion of the motor, and the bearing assemblies adjacent to the stator, typically operate at an increased temperature when the spindle motor assembly is operating at higher rotational speeds and/or with increased storage capacity. When operating the bearing assemblies at faster rotational speeds and/or higher temperatures, the bearing assemblies tend to lose lubricant at a faster rate, leading to a shortened bearing assembly life that impacts the overall reliability and performance of the magnetic storage system.

A couple of approaches have been considered to reduce both the motor and the bearing assembly temperatures by increasing the heat transfer out of the motor to the base plate and cover where heat can be removed by convective heat transfer. One approach is to position the stator below the bearing assemblies or external to the bearing assemblies. Although this approach improves the heat sinking of motor losses into the base plate, these designs compromise the bearing span or bearing size and is typically not suited for high performance disk drives. Furthermore, this approach does not fully support the spindle motor hub during a heat shrink disk clamp process.

Another approach is to make the shaft out of a material that is sufficiently thermally conductive. Unfortunately, certain spindle motor design configurations, particularly those suitable for high performance disk drives such as configurations with the stators positioned between the bearing assemblies to provide optimal efficiency and high spindle stiffness, requires a stainless steel shaft having the same coefficient of thermal expansion (CTE) as other parts of the spindle motor assembly. If the CTE of the shaft and other parts of the spindle motor assembly do not match, the bearing preload can not be maintained through temperature changes of the spindle motor assembly. This mismatch may severely impact the performance of the spindle motor assembly. Accordingly, selecting a shaft made of a material that is more thermally conductive than stainless steel may not be suitable for most spindle motors used in high performance disk drives.

In light of the drawbacks of these approaches, there exists a need to improve the heat transfer out of the motor in a spindle motor assembly suitable for high performance disk drives.

SUMMARY OF THE INVENTION

It is desirable to increase the heat transfer flowing out of the spindle motor assembly to reduce the operating temperature of the motor and bearing assemblies.

It is also desirable to match the coefficients of thermal expansion between the shaft and various other components of the spindle motor assembly to maintain the preload across the operating temperature range while increasing the heat transfer flowing out of the motor.

A spindle motor assembly is described. The spindle motor assembly includes a bearing assembly, a stationary shaft, a hub, and a motor. The stationary shaft has an outer peripheral surface attached to an inner peripheral surface of the bearing assembly. The stationary shaft is capable of operating as a heat pipe. The motor, positioned between the hub and the stationary shaft, is operable to rotate said hub with respect to a central axis of said stationary shaft. The stationary shaft may include a hollow central portion that is lined with a wick and partially filled with fluid.

A method of assembling a stationary shaft having an integral heat pipe is also described. A stationary shaft having a hollow central region and an open end is provided. The hollow central region is lined with a wick and partially filled with a fluid. The hollow central portion is evacuated. Then, the open end of the stationary shaft is sealed. The stationary end may be sealed by a brazing process.

Other desires, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which:

FIG. 3 illustrates an exploded view of one embodiment of a motor shaft having an integral heat pipe;

FIG. 4 illustrates one embodiment of a threaded cap for use with the motor shaft.

DETAILED DESCRIPTION

Figure 1:
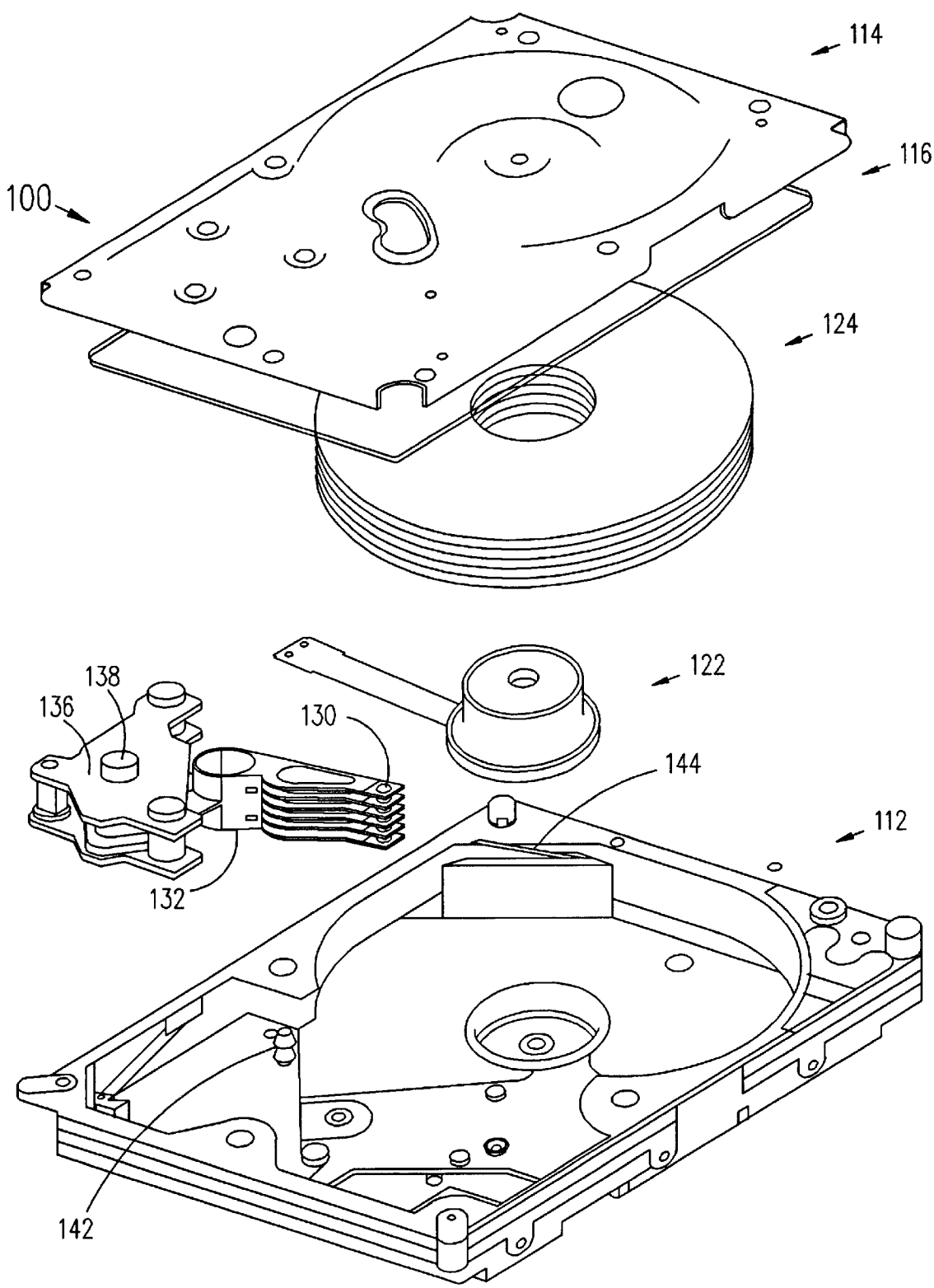
FIG. 1 illustrates an exploded view of one embodiment of a disk drive.

FIG. 1 illustrates an exploded view of a disk drive 100. When assembled, disk drive 100 is housed within a base plate 112 and a housing cover 114 with a seal 116 positioned between base plate 112 and cover 114.

Disk drive 100 includes one or more magnetic disks 124. Disks 124 may be conventional particulate or thin film recording disks, which are capable of storing data in the form of magnetic transitions on a series of concentric, closely spaced tracks that form the surface of disks 124. For one embodiment, both sides of disks 124 are available for storage, and it will be recognized by one of ordinary skill in the art that disk drive 100 may include any number of such disks 124.

Mounted within base plate 112 is a spindle motor assembly 122. Disks 124 are mounted on the hub of spindle motor assembly 122. A spindle motor (not shown) positioned within spindle motor assembly 122, powers the rotation of the spindle motor hub along with disks 124 mounted on the spindle motor hub. A more detailed illustration of spindle motor assembly 122 is shown in FIG. 2.

Disk Drive 100 typically includes one transducer for each side of a disk 124. Each transducer may include separate read and write elements or a single read/write element. Information is written or read from disks 124 by magnetic heads or transducers, which are supported by sliders coupled to suspensions or load springs (not shown). The suspensions are attached to an actuator assembly. The actuator assembly may include separate actuator arms 130 on an E-block or comb 132. A voice-coil motor (vcm) 136 powers the pivoting of comb 132 on a shaft 138.

Disk drive electronics (not shown) cooperates with the transducer to read data from and write data to disks 124. Writing data to a disk 124 generally involves passing current through the write element of the transducer to produce magnetic lines of flux which magnetize a specific location of the disk surface. Reading data from a specified disk location is typically accomplished by a read element of the transducer sensing the magnetic field or flux lines emanating from the magnetized locations of a disk 124. As the read element passes over the rotating disk surface, the interaction between the read element and the magnetized locations on the disk surface results in the production of electrical signals in the read element. The electrical signals correspond to transitions in the magnetic fields.

Figure 2:
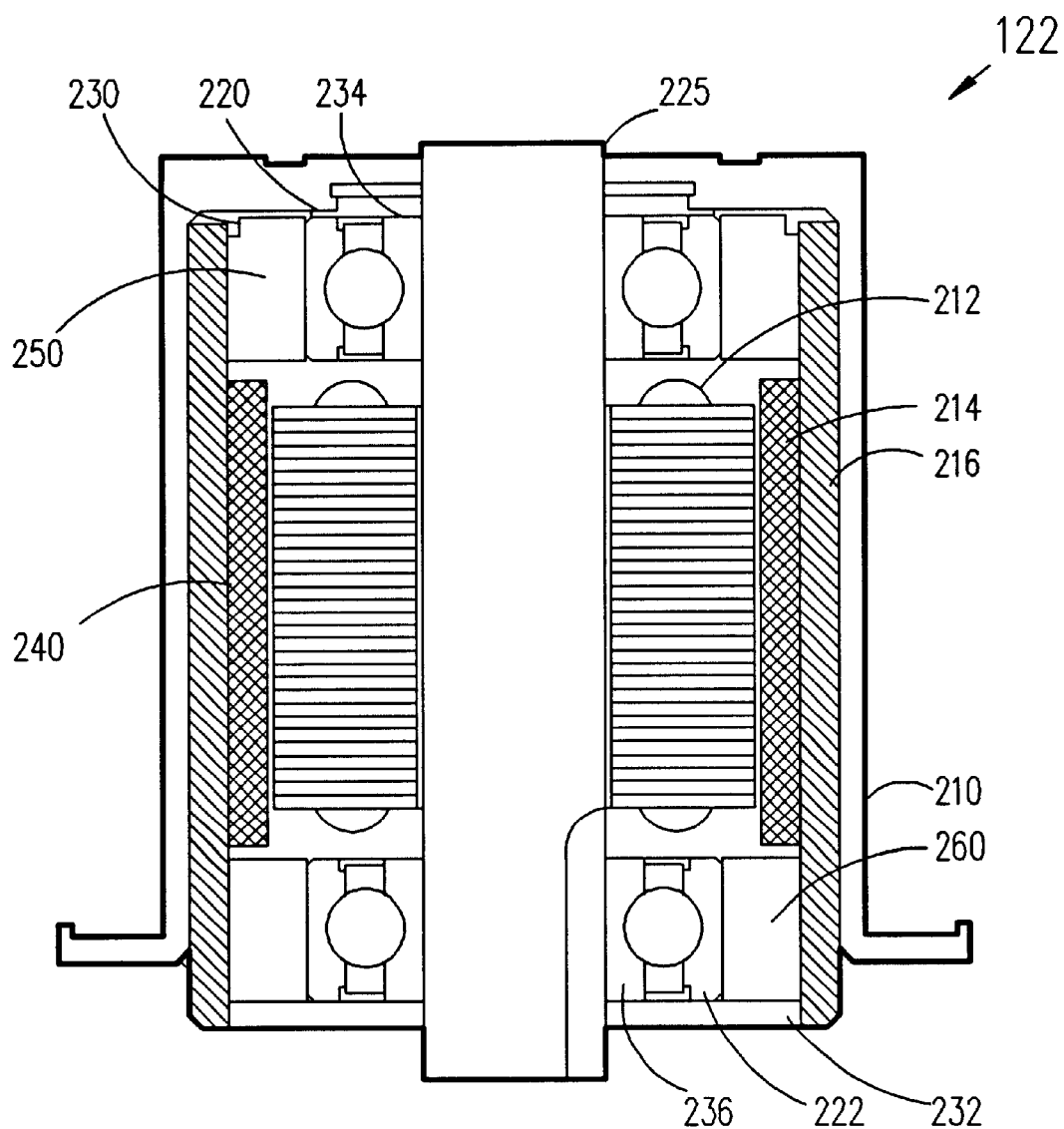
FIG. 2 illustrates a cross-sectional view of one embodiment of a spindle motor assembly.

FIG. 2 illustrates a cross-sectional view of one embodiment of spindle motor assembly 122. Spindle motor assembly 122 generally includes a hub 210, a stationary shaft 225, two bearing assemblies 250 and 260, and a motor 240. Hub 210 is used to mount at least one magnetic disk.

Stationary (or fixed) shaft 225 represents a shaft with an integrated heat pipe to increase the dissipation of heat through the shaft 225. Generally, the heat generated by the stator 212 is dissipated through shaft 225. A more detailed illustration of shaft 225 is shown in FIG. 3.

Bearing assembly 250 includes bearing balls 220, an inner race 234 and an outer race 230. Similarly, bearing assembly 260 includes bearing balls 222, an inner race 236 and an outer race 232. Bearing assemblies 250 and 260 have an inner periphery surface which is attached by either a light press fit or a slip fit with adhesive to an outer periphery surface of stationary shaft 225. The bearing assemblies 250 and 260 are positioned between stationary shaft 210 and hub 210 such that hub 225 is capable of rotating about the central axis of stationary shaft 225 when powered by motor 240. For alternative embodiments, bearing assembly 250 is not limited to ball bearing assemblies and may include other types of bearing assemblies such as hydrodynamic fluid bearing assemblies.

Motor 240 may be a brushless dc motor that generally includes a stator 212, a rotor magnet 214 and a rotor back iron 216. For one embodiment, motor 240 is arranged such that stator 212 is positioned between bearing assemblies 250 and 260. By positioning stator 212 in this manner, optimal efficiency and spindle pitch stiffness is achieved. Stator 212 has an inner peripheral surface that may be attached by a light press fit and adhesive to the outer peripheral surface of stationary shaft 225. For alternative embodiments, stator 212 may not be located between bearing assemblies 250 and 260. For example, the stator may be positioned below the bearing assemblies or external to the bearing assemblies. Rotor magnet 214 is attached to rotor back iron 216, which is attached to the inner peripheral surface of hub 210. Rotor back iron 216 is used to support outer races 230 and 232. Inner races 234 and 236 mount the bearing assemblies 250 and 260 to stationary shaft 225.

Although spindle motor assembly 122 is described in accordance with disk drive 100, the spindle motor of the present invention may be extended to various other applications that require a high-performance motor. For example, various embodiments of the spindle motor may be extended to laser printer applications and laser bar-code reader applications.

FIG. 3 illustrates an exploded view of one embodiment of stationary shaft 225. Stationary shaft 225 may be referred to as a hollow shaft having an integral heat pipe. Shaft 225 includes a hollow elongated portion 301 that may be made of a 300 or 400 series type stainless steel. For one embodiment, shaft 225 has a closed end (also referred to as the bottom end) and an open end (also referred to as the top end). For one embodiment the bottom end of shaft 225 may include a threaded stud 303 for attaching shaft 225 (and spindle motor 122) to base plate 112.

For one embodiment, bottom end is attached to a base plate 112 made of Aluminum or some other material having better heat conductivity than shaft 225. For alternative embodiments, the bottom end of shaft 225 may be attached to some other structure that operates as either a heat sink or heat fin.

Similarly, the top end of shaft 225 may include a cap 310 having a threaded stud 304 for attaching shaft 225 to housing cover 114. The convective heat transfer of housing cover 114 may be improved by selecting a material that has good thermal conductivity such as aluminum, avoiding the use of decals or constrain layer dampers near the shaft, and using a heat fin. Cap 310 is used to provide a seal for elongated portion 301. In order to provide for more efficient axial length packaging of disk drive 100, alternative embodiments may include threaded caps at the top and/or bottom sides of shaft 225. FIG. 4 illustrates a threaded cap 400 that may be used to attach shaft 225 to base plate 112 and/or housing cover 114. Threaded cap 400 includes a tapped hole 401 which has internal threads.

For one embodiment, cap 310 may be attached to elongated portion 301 by a brazing process. More specifically, a gasket 320 formed of a brazing material and positioned between elongated portion 301 and cap 310, is brazed to form an intimate contact between cap 310 and elongated portion 301. For one embodiment, cap 310 and elongated portion 301 are both made of the same material such as 300 or 400 series stainless steel, and gasket 320 is made of a softer metal such as a copper alloy. Suitable brazing materials for gasket 320 may include brass, copper silicon or manganese bronz. Generally, brazing refers to a process in which two dissimilar metals are heated until the metals become soft and molten. As the metals cool, they are joined together.

The hollow elongated portion 301 sealed with cap 310 forms the outer shell of the heat pipe integrally formed with shaft 225. Positioned within the hollow elongated portion 301 is a wick lining 302 for transporting fluid within shaft 225 via capillary action. The wick lining 302 may be made from a woven cloth, fiber glass, porous metal, ceramic tubes or wire screening. For alternative embodiments, the wick lining may be replaced with small grooves on the inner circumferential surface of hollow elongated portion 301 that is capable of transporting fluid via capillary action. The fluid may include, for example, water, acetone, ammonia, or JPA. When the hollow elongated portion 301 containing the wick lining 302 is filled with a fluid and sealed with minimal gas or air (near vacuum), shaft 225 may function as a heat pipe while spindle motor 122 is operating.

The operation of the heat pipe is described below. Structurally, the heat pipe includes an enclosed outer shell (i.e., the elongated portion 301 sealed with cap 310), a porous wick 302, and a working fluid. Typically, sufficient fluid is placed inside the heat pipe to wet the entire wick. The wick is generally held tightly and uniformly against the inside wall of the heat pipe. For one embodiment, the wick is made from a copper mesh material and the fluid used is water.

Generally, a heat pipe is referred to as a thermal device that can transfer significant amounts of heat with very little temperature drop along its length. A heat pipe may be viewed as a combined boiling and condensing system which uses capillary action. Thus, a heat pipe includes both a condensing section and an evaporating section. The capillary action is used to return the working fluid that was condensed in the condensing section to the evaporating section. The function of the working fluid within the heat pipe is to absorb the heat energy received at the evaporating section, transport it through the heat pipe, and release this energy at the condensing section. This process of evaporating and condensing the working fluid is often referred to as boiling and condensation heat transfer.

More specifically, as the fluid vaporizes, the pressure at the evaporating section increases due to the thermal excitation of the molecules of the newly created vapor. This increase in vapor pressure increases the pressure difference between the evaporating section (at one end of the heat pipe) and the condensing section (at the other end of the heat pipe). As a result, the vapor, including the heat energy, moves toward the condensing section. The lower temperature at the condensing section causes the vapor to turn back into a fluid causing the release of thermal energy. As the fluid condenses, the vapor pressure created by the molecules decreases, so that the necessary pressure difference between the condensing and evaporating sections is maintained for continual heat flow.

Figure 5:
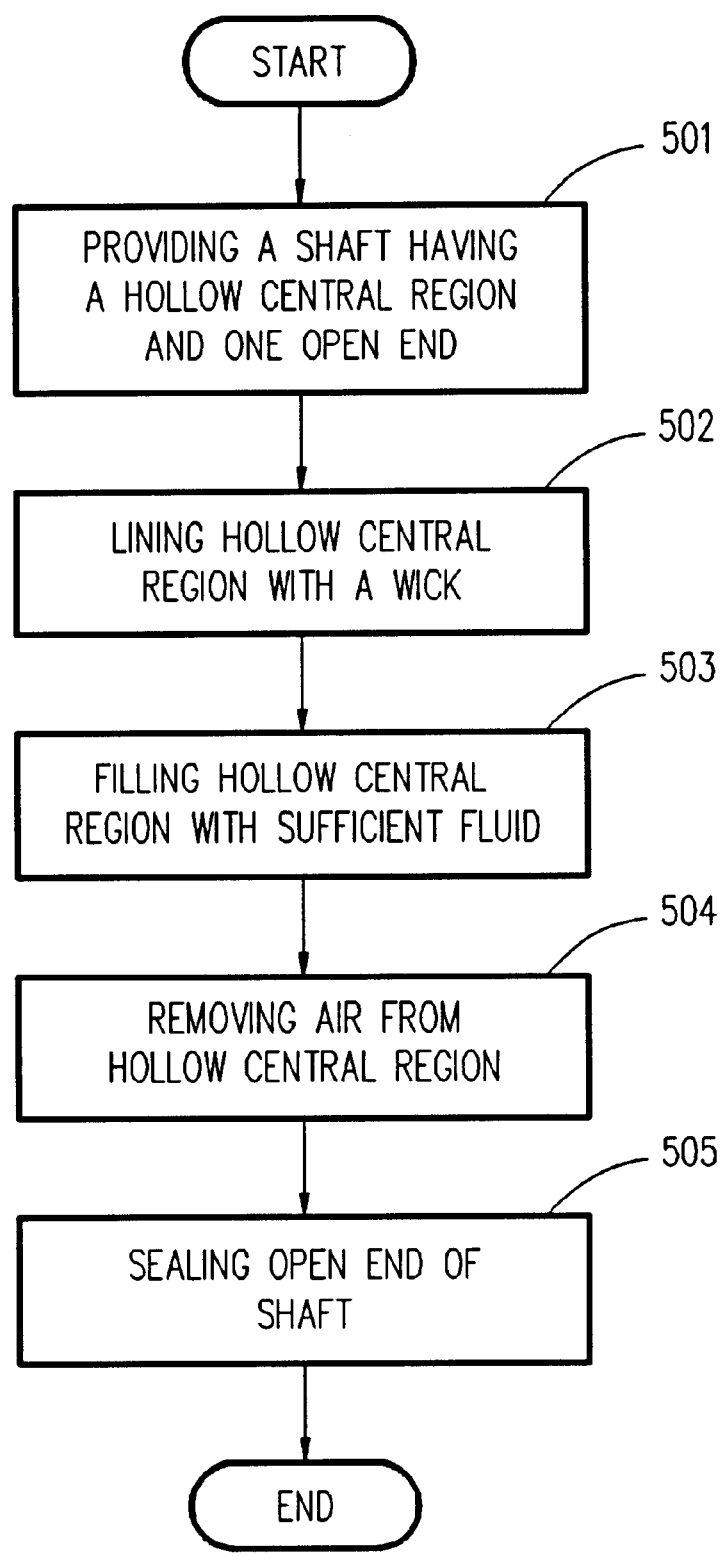
FIG. 5 is flow chart illustrating a method of assembling the motor shaft having an integral heat pipe.

Flow chart 500 shown in FIG. 5 illustrates one method of assembling a motor shaft having an integral heat pipe. According to step 501, a shaft having a hollow central region and one open end is provided. The hollow central region is formed in the elongated portion 301 of shaft 225 as shown in FIG. 3. The hollow central region is then lined with a wick 302 as shown in accordance with step 502. The wick 302 may be a copper mesh in the shape of a cylinder or tube (or some other material that is capable of transporting the fluid via capillary action) that is inserted into the hollow central region. For alternative embodiments, wick 302 may be formed by grooves on the inner circumferential surface of the elongated portion 301 of shaft 225. In step 503, sufficient working fluid is then placed inside the hollow central region.

Next, substantially all of the air within the hollow central region of shaft 225 is evacuated such that the hollow central region forms a near vacuum region, as shown in step 504. Lastly, the open end of shaft 310 is sealed. For one embodiment, the cap structure (including cap 310 and gasket 320) are joined to the open end of shaft 225 by a brazing process. Generally, brazing processes are used to form an intimate contact or joint between two metals. Typically, the metals to be joined are made of dissimilar brazing material. Common brazing materials may include brass, copper silicon, and manganese bronz. When applying a brazing process, the brazing material (e.g., cap 310, gasket 320, and elongated portion 301) are heated until the metals are in a molten state. The heat is then removed such that the metals may cool. As the metals cool, they join together.

A vacuum nozzle may be used to perform the evacuation step 504 and the sealing step 505. The vacuum nozzle may include an induction coil for providing heat and a fixture for holding cap 310 and gasket 320. Once the vacuum nozzle is placed over the open end of shaft 225 at the outer diameter of elongated portion 301, the hollow central region containing the wick and the fluid is evacuated. The cap 310 and gasket 320 may be placed onto the open end of shaft 225 by slip-fitting cap 310 and gasket 320 on the outer diameter of shaft 225. Heat may then be applied via the induction coils of the vacuum nozzle to perform a brazing process. As previously mentioned, gasket 320 is made out of a brazing material. The brazing material of gasket 320 is dissimilar to the brazing material of cap 310 and the open end of elongated portion 301. The heat applied by the vacuum nozzle forms a brazed joint at the flange of cap 310 and the top surface of elongated portion 301, and at the slip-fit between the inner diameter of elongated portion 301 and the outer diameter of cap 310. The brazed joints formed between the cap structure and the elongated portion 301 are sufficient to form a reliable vacuum seal.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A spindle motor assembly for use in a magnetic storage system, comprising:
   a bearing assembly having an inner peripheral surface;
   a stationary shaft having a central axis and an outer peripheral surface attached to said inner peripheral surface of said bearing assembly, said stationary shaft capable of operating as a heat pipe which incorporates evaporation and condensation;
   a hub positioned external to said bearing assembly; and
   a motor positioned between said hub and said stationary shaft, said motor operable to rotate said hub with respect to said central axis of said stationary shaft.

2. The spindle motor assembly of claim 1, wherein said stationary shaft includes a sealing structure and an elongated portion having a hollow center region, said hollow center region includes a wick and a fluid.

3. The spindle motor assembly of claim 2, wherein said fluid is transported within said hollow center portion via capillary action.

4. The spindle motor assembly of claim 3, wherein said fluid is water.

5. The spindle motor assembly of claim 3, wherein said stationary shaft includes an evaporating section and a condensing section for generating a vapor heat transfer process within said stationary shaft.

6. The spindle motor assembly of claim 2, wherein said wick includes a copper mesh tube positioned within said hollow center portion.

7. The spindle motor assembly of claim 2, wherein said sealing structure includes a cap and a gasket, said gasket positioned between said cap and said elongated portion.

8. The spindle motor assembly of claim 7, wherein said cap is formed of stainless steel.

9. The spindle motor assembly of claim 8, wherein said stainless steel comprises 400 series stainless steel.

10. The spindle motor assembly of claim 1, wherein said stationary shaft is formed of stainless steel.

11. The spindle motor assembly of claim 10, wherein said stainless steel is 400 series stainless steel.

12. The spindle motor assembly of claim 1, wherein said stationary shaft includes at least one threaded stud at one end of said stationary shaft.

13. The spindle motor assembly of claim 1, wherein said stationary shaft includes at least one end cap having a threaded hole.

14. The spindle motor of claim 1 further comprising a second bearing assembly, and wherein said motor includes a stator positioned between said bearing assembly and said second bearing assembly.

15. The spindle motor assembly of claim 1, wherein said bearing assembly is a ball bearing assembly.

16. A magnetic storage system, comprising:
   at least one magnetic storage disk having a data surface of concentric data tracks;
   a slider maintained in an operative relationship with said data surface of the disk when said disk is rotating;
   a transducer attached to said slider for reading data from and writing data to said data surface;
   an actuator assembly for moving said slider generally radially relative to said disk to allow the transducer to access said data tracks; and
   a spindle motor assembly attached to said disk for rotation, said spindle motor assembly including
      a bearing assembly having an inner peripheral surface,
      a stationary shaft having a central axis and an outer peripheral surface attached to said inner peripheral surface of said bearing assembly, said stationary shaft capable of operating as a heat pipe which incorporates evaporation and condensation,
      a hub positioned external to said bearing assembly, and
      a motor positioned between said hub and said stationary shaft, said motor operable to rotate said hub with respect to said central axis of said stationary shaft.

17. The magnetic storage system of claim 16, wherein said stationary shaft includes a sealing structure and an elongated portion having a hollow center region, said hollow center region includes a wick and a fluid.

18. The magnetic storage system of claim 17, wherein said fluid is transported within said hollow center portion via capillary action.

19. The magnetic storage system of claim 18, wherein said fluid is water.

20. The magnetic storage system of the claim 18, wherein said stationary shaft includes an evaporating section and a condensing section for generating a vapor heat transfer process within said stationary shaft.

21. The magnetic storage system of claim 17, wherein said wick includes a copper mesh tube positioned within said hollow center portion.

22. The magnetic storage system of claim 17, wherein said sealing structure includes a cap and a gasket, said gasket positioned between said cap and said elongated portion.

23. The magnetic storage system of claim 16, wherein said stationary shaft is formed of stainless steel.

* * * * *